US012187229B2

(12) United States Patent
Sera et al.

(10) Patent No.: US 12,187,229 B2
(45) Date of Patent: Jan. 7, 2025

(54) CENTER CONSOLE STRUCTURE FOR VEHICLE

(71) Applicant: Mazda Motor Corporation, Hiroshima (JP)

(72) Inventors: Naohiro Sera, Aki-gun (JP); Osamu Ueda, Aki-gun (JP); Narumi Nahara, Aki-gun (JP); Kouji Furukawa, Aki-gun (JP); Shohei Kuroda, Aki-gun (JP); Hiroshi Ohno, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 525 days.

(21) Appl. No.: 17/527,169

(22) Filed: Nov. 16, 2021

(65) Prior Publication Data

US 2022/0194283 A1   Jun. 23, 2022

(30) Foreign Application Priority Data

Dec. 22, 2020   (JP) ................................ 2020-212451

(51) Int. Cl.
*B60R 7/04*   (2006.01)
*B60N 2/75*   (2018.01)
(Continued)

(52) U.S. Cl.
CPC ............... *B60R 7/04* (2013.01); *B60N 2/793* (2018.02); *B60R 11/0241* (2013.01); *B60N 3/00* (2013.01);
(Continued)

(58) Field of Classification Search
CPC .................. B60R 7/04; B60R 11/0241; B60R 2011/0294; B60R 2011/0007; B60N 2/793; B60N 3/102; H02J 50/10
(Continued)

(56) References Cited

U.S. PATENT DOCUMENTS 8,465,076 B1 * 6/2013 Quijano .................... B60R 7/04
296/37.8
9,096,177 B2   8/2015 Boundy et al.
(Continued)

FOREIGN PATENT DOCUMENTS

CN    104228692 B    4/2017

OTHER PUBLICATIONS

"Cadillac CT6-All You Need to Know!", Apr. 5, 2015, printed fromt website https://www.wallacechev.com/blog/cadillac-ct6-all-you-need-to-know/.*
(Continued)

*Primary Examiner* — Jason S Morrow
(74) *Attorney, Agent, or Firm* — XSENSUS LLP (57) ABSTRACT

A center console structure for the vehicle includes a console body; an armrest; and a power supply section that wirelessly transmits electric power to the mobile terminal via a placement surface where the mobile terminal is placed. An upper surface of the console body includes a terminal accommodation section having the placement surface and arranged on a vehicle lower side of the armrest; and a top plate section provided with an operation section accepting an occupant's operation and arranged on a vehicle front side of the terminal accommodation section. The terminal accommodation section includes a rear wall portion positioning the mobile terminal where, in a perpendicular cross section along a vehicle front-rear direction, a front end of the mobile terminal is located in a virtual area, the mobile terminal having a terminal width that is equal to or longer than 67 mm and equal to or shorter than 84 mm.

20 Claims, 9 Drawing Sheets (51) Int. Cl.
*B60R 11/02* (2006.01)
*B60N 3/00* (2006.01)
*B60R 11/00* (2006.01)
*B60R 16/037* (2006.01)
*H02J 50/10* (2016.01)

(52) U.S. Cl.
CPC ..... *B60R 2011/0007* (2013.01); *B60R 16/037* (2013.01); *H02J 50/10* (2016.02)

(58) Field of Classification Search
USPC ........................................................ 296/1.09
See application file for complete search history.

(56) References Cited

U.S. PATENT DOCUMENTS

| | | | | |
|---|---|---|---|---|
| 9,637,059 | B2* | 5/2017 | Fesenmyer | B60N 2/793 |
| 9,701,201 | B2* | 7/2017 | Joo | B60N 2/78 |
| 9,783,123 | B2* | 10/2017 | Hélot | B60R 11/0252 |
| 11,605,978 | B2* | 3/2023 | Mukai | H02J 50/005 |
| 11,794,658 | B2* | 10/2023 | Minoyama | B60R 7/04 |
| 2014/0203770 | A1* | 7/2014 | Salter | H02J 50/80 |
| | | | | 320/108 |
| 2014/0361567 | A1 | 12/2014 | Singh | |
| 2021/0268966 | A1* | 9/2021 | Frauenfelder | B60R 11/02 |
| 2021/0284072 | A1* | 9/2021 | Minoyama | H02J 50/005 |
| 2022/0194279 | A1* | 6/2022 | Sera | B60R 7/04 |
| 2023/0136911 | A1* | 5/2023 | Nukui | B60N 2/763 |
| | | | | 296/24.34 |
| 2024/0101034 | A1* | 3/2024 | Stephan | B60R 11/0229 |

OTHER PUBLICATIONS

Extended European search report issued on May 5, 2022, in corresponding European patent Application No. 21209015.3, 6 pages.

* cited by examiner

CENTER CONSOLE STRUCTURE FOR VEHICLE

CROSS-REFERENCE TO RELATED APPLICATION

The present application claims priority to Japanese application number 2020-212451 filed in the Japanese Patent Office on Dec. 22, 2020, the entire contents of which is incorporated herein by reference.

TECHNICAL FIELD

The present disclosure relates to a center console structure that includes, as a charger charging a mobile terminal, for example, a power supply section wirelessly transmitting electric power to the mobile terminal.

BACKGROUND

In recent years, with wide use of mobile terminals such as smartphones, some vehicles such as automobiles include a charger that charges the mobile terminal.

For example, a center console structure for a vehicle is disclosed in Patent document 1. In the center console structure for the vehicle, a terminal accommodation section, on which the mobile terminal is placed, and a power supply section that wirelessly transmits electric power to the mobile terminal via the terminal accommodation section are arranged in a console box.

Furthermore, in this Patent document 1, a fixing section that holds the mobile terminal with the terminal accommodation section is provided to a lower surface of an armrest serving as a lid of the console box, and is projected to a vehicle lower side. In this way, in Patent document 1, displacement of the mobile terminal during travel of the vehicle is suppressed. As a result, the mobile terminal can stably be supplied with the electric power.

By the way, every time getting off the vehicle, for example, an occupant has to open the armrest to take out the mobile terminal from the console box. Thus, the center console structure for the vehicle disclosed in Patent document 1 has a problem of being inconvenient.

To solve such a problem, for example, it is considered to provide the terminal accommodation section in a front portion of the center console so as to facilitate taking out the mobile terminal, which improves convenience.

However, an operation section including a shift lever, a switch that switches various settings of the vehicle, and the like is provided in the front portion of the center console. Thus, in the case where the terminal accommodation section is arranged in the front portion of the center console, the operation section and the terminal accommodation section are arranged close to each other. For this reason, when the occupant operates the operation section, the occupant's hand possibly contacts the mobile terminal that is being charged, which possibly degrades operability of the operation section.

PATENT DOCUMENTS

[Patent document 1] U.S. Pat. No. 9,096,177

SUMMARY

Problems to be Solved

The present disclosure has been made in view of the above-described problem and therefore has a purpose of providing a center console structure for a vehicle capable of simultaneously securing operability of an operation section and a take-out property of a mobile terminal.

Solutions for Solving the Problems

The present disclosure is a center console structure for a vehicle including: a console body that extends in a vehicle front-rear direction in a vehicle cabin; an armrest that is arranged on a vehicle upper side of the console body; and a power supply section that wirelessly transmits electric power to a mobile terminal via a placement surface on which the mobile terminal is placed. An upper surface of the console body includes: a terminal accommodation section that has the placement surface and is arranged on a vehicle lower side of the armrest; and a top plate section that is provided with an operation section accepting an occupant's operation and is arranged on a vehicle front side of the terminal accommodation section. In a perpendicular cross section along a vehicle front-rear direction, a virtual linear line that connects a rear end of the operation section and a front end of the armrest is set as a first virtual linear line, a substantially vertical virtual linear line that passes a position separated to the vehicle front side from the front end of the armrest by a specified distance or a front end position of the armrest is set as a second virtual linear line, and a range surrounded by the first virtual linear line, the second virtual linear line, and the upper surface of the console body is set as a virtual area. In the perpendicular cross section along the vehicle front-rear direction, the terminal accommodation section includes a positioning portion positioning the mobile terminal such that a front end of the mobile terminal is located in the virtual area, and the mobile terminal has a terminal width that is a length along a substantially parallel direction to the placement surface and is equal to or longer than 67 mm and equal to or shorter than 84 mm.

According to the present disclosure, the center console structure for the vehicle can simultaneously secure operability of the operation section and a take-out property of the mobile terminal.

More specifically, due to the positioning portion of the terminal accommodation section, the front end of the mobile terminal is located on a vehicle rear side of the first virtual linear line. Thus, the center console structure for the vehicle can prevent the occupant's hand from contacting the mobile terminal when the occupant operates the operation section in a state of placing his/her forearm on the armrest.

Furthermore, due to the positioning portion of the terminal accommodation section, the front end of the mobile terminal is located on the vehicle front side of the second virtual linear line. Thus, the center console structure for the vehicle can prevent the mobile terminal from being hidden on the vehicle lower side of the armrest, which makes it difficult to take out the mobile terminal.

Therefore, the center console structure for the vehicle can simultaneously secure the operability of the operation section and the take-out property of the mobile terminal.

As an aspect of the present disclosure, in plan view, the power supply section may be arranged to overlap both of the armrest and the placement surface of the terminal accommodation section.

With this configuration, in the center console structure for the vehicle, the armrest can reliably be interposed between the mobile terminal that is being charged and the occupant's head.

Accordingly, even when the occupant moves his/her line of sight to the mobile terminal, for example, in the center console structure for the vehicle, the armrest can reliably hide the mobile terminal from the occupant's eyesight.

In this way, the center console structure for the vehicle can inhibit inattentive driving by the occupant without interfering with taking out of the mobile terminal.

As another aspect of the present disclosure, in the perpendicular cross section along the vehicle front-rear direction, the top plate section and the placement surface of the terminal accommodation section may be formed such that the front end of the mobile terminal is located on the vehicle upper side of the top plate section.

With this configuration, the center console structure for the vehicle can provide a clearance between a portion near the front end of the mobile terminal and the top plate section. Thus, in the center console structure for the vehicle, when attempting to take out the mobile terminal, the occupant can grasp and take out the mobile terminal in the vehicle up-down direction. In this way, the center console structure for the vehicle can further facilitate taking out of the mobile terminal.

As another aspect of the present disclosure, in plan view, a front end edge of the armrest may be formed in a substantially curved shape in which a substantially central portion in a vehicle width direction is projected to the vehicle front side.

With this configuration, in plan view, the center console structure for the vehicle can prevent a corner portion on the vehicle front side in the placement surface from being hidden by the armrest. In other words, in plan view, the center console structure for the vehicle can expose the corner portion on the vehicle front side in the placement surface.

Accordingly, even in the case where the mobile terminal is heavy and long in the substantially parallel direction to the placement surface, or even in the case where the mobile terminal is short in the substantially parallel direction to the placement surface, the occupant can firmly grasp and take out the mobile terminal without interference with the armrest.

Furthermore, in the center console structure for the vehicle, even in a state of placing his/her forearm on the armrest, the occupant can easily touch the mobile terminal placed on the placement surface by moving his/her wrist to one side in the vehicle width direction.

In this way, the occupant can take out the mobile terminal without significantly moving his/her line of sight. Thus, the center console structure for the vehicle can improve the take-out property of the mobile terminal.

As another aspect of the present disclosure, in the armrest, a lower surface that opposes the placement surface is formed as an inclined surface inclined such that a front end thereof is located on the vehicle upper side with respect to a rear end.

With this configuration, the center console structure for the vehicle can secure a large space above the front end of the placement surface of the terminal accommodation section. Therefore, the center console structure for the vehicle can further facilitate taking out of the mobile terminal.

Advantages

The present disclosure can provide the center console structure for the vehicle capable of simultaneously securing the operability of the operation section and the take-out property of the mobile terminal.

DETAILED DESCRIPTION

A description will hereinafter be made on an embodiment of the present disclosure with reference to the drawings.

A center console 1 in this embodiment has a charging function to wirelessly transmit electric power to a mobile terminal 2. A description will be made on a structure of such a center console 1 with reference to FIG. 1 to FIG. 9.

Figure 1:
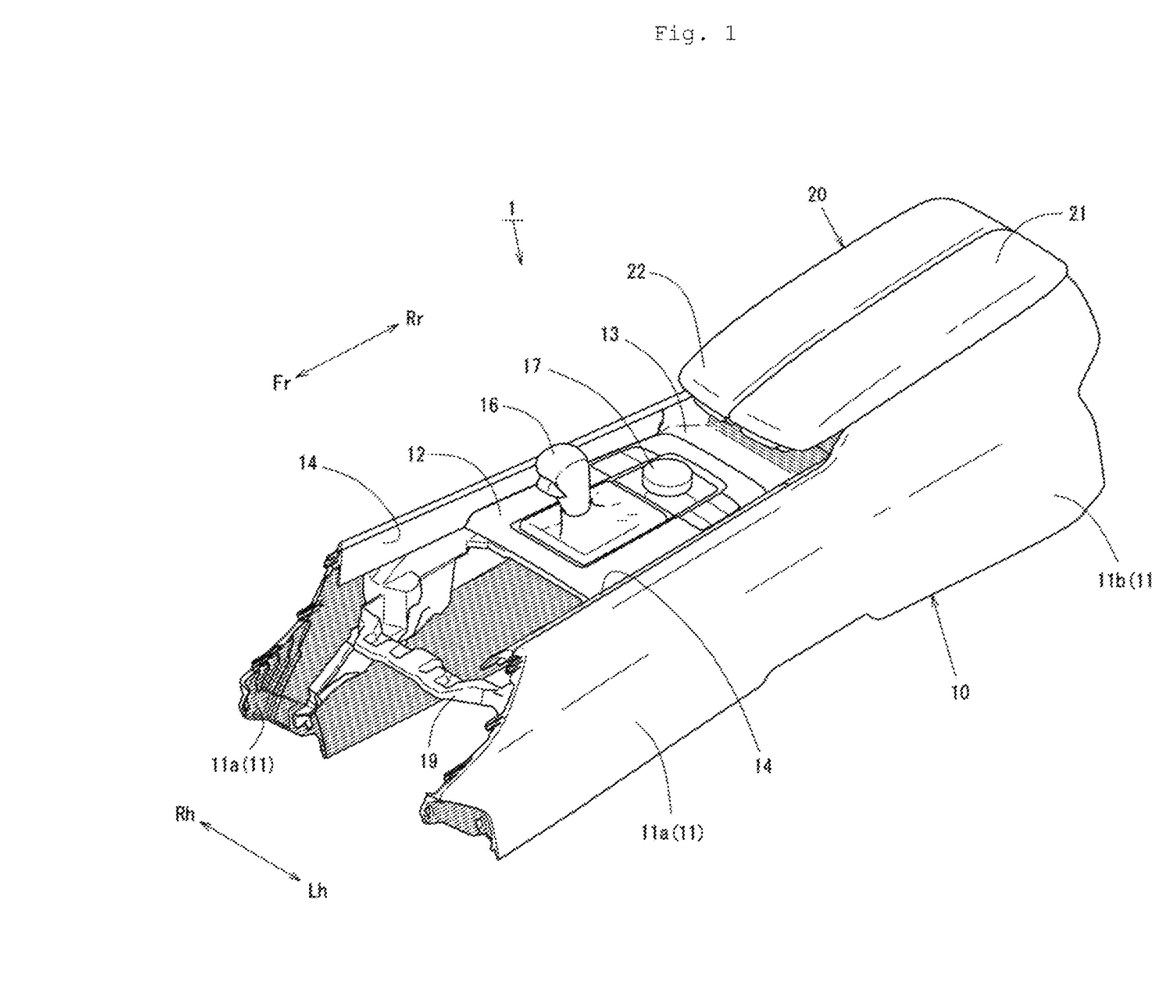
FIG. 1 is an external appearance perspective view illustrating external appearance of a center console that is seen from a vehicle upper front side.
Figure 2:
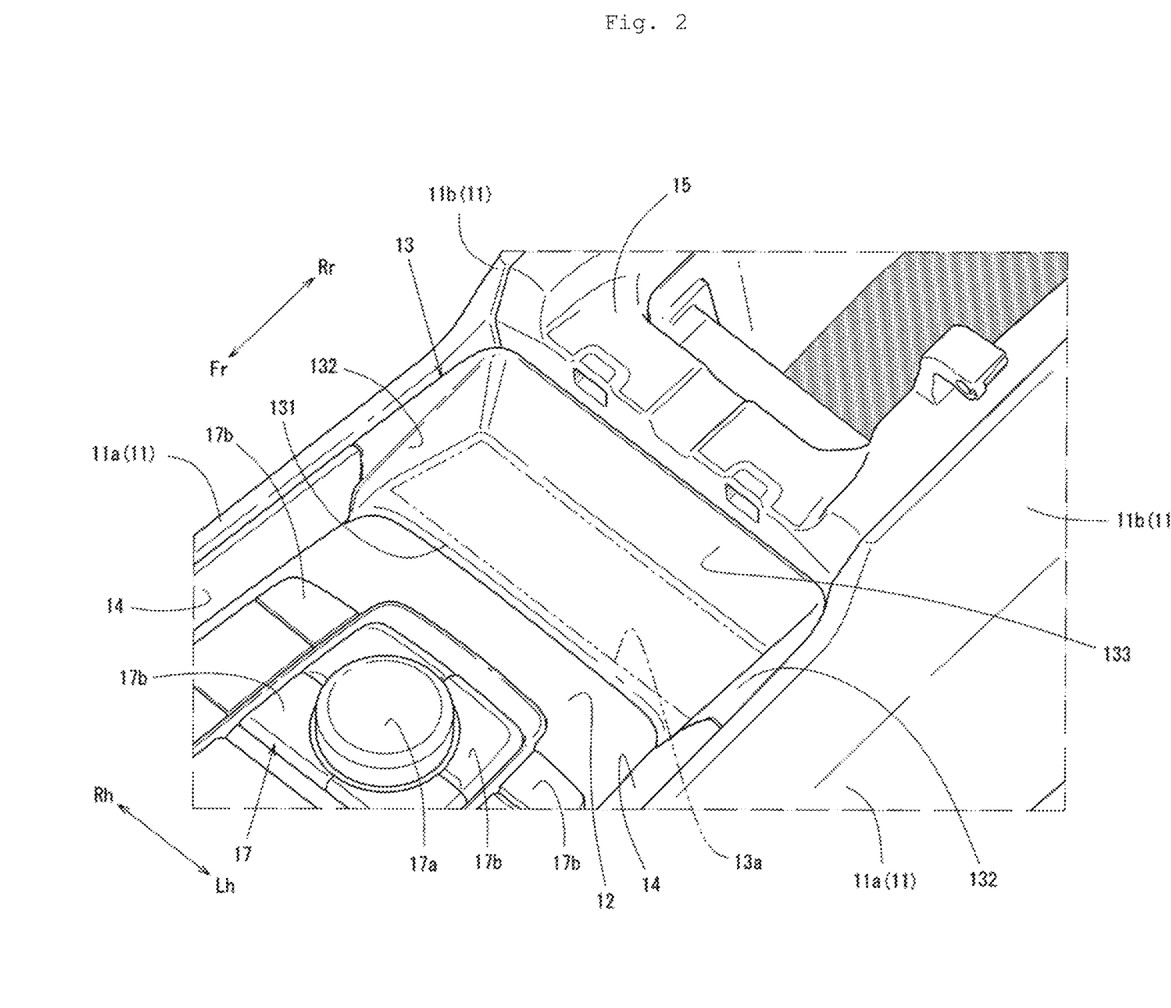
FIG. 2 is an external appearance perspective view illustrating external appearance of an area around a terminal accommodation section.
Figure 3:
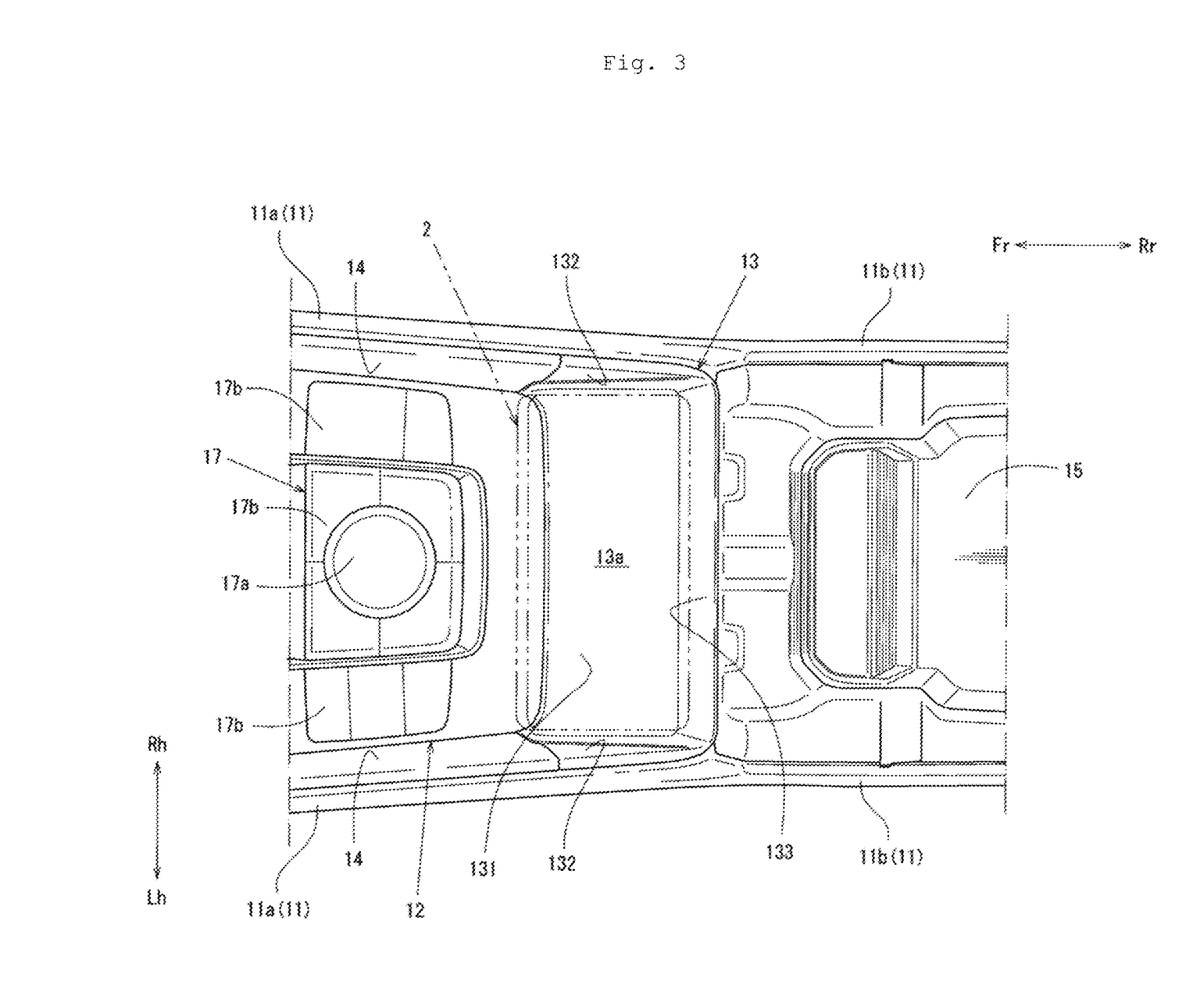
FIG. 3 is a plan view illustrating a console body.
Figure 4:
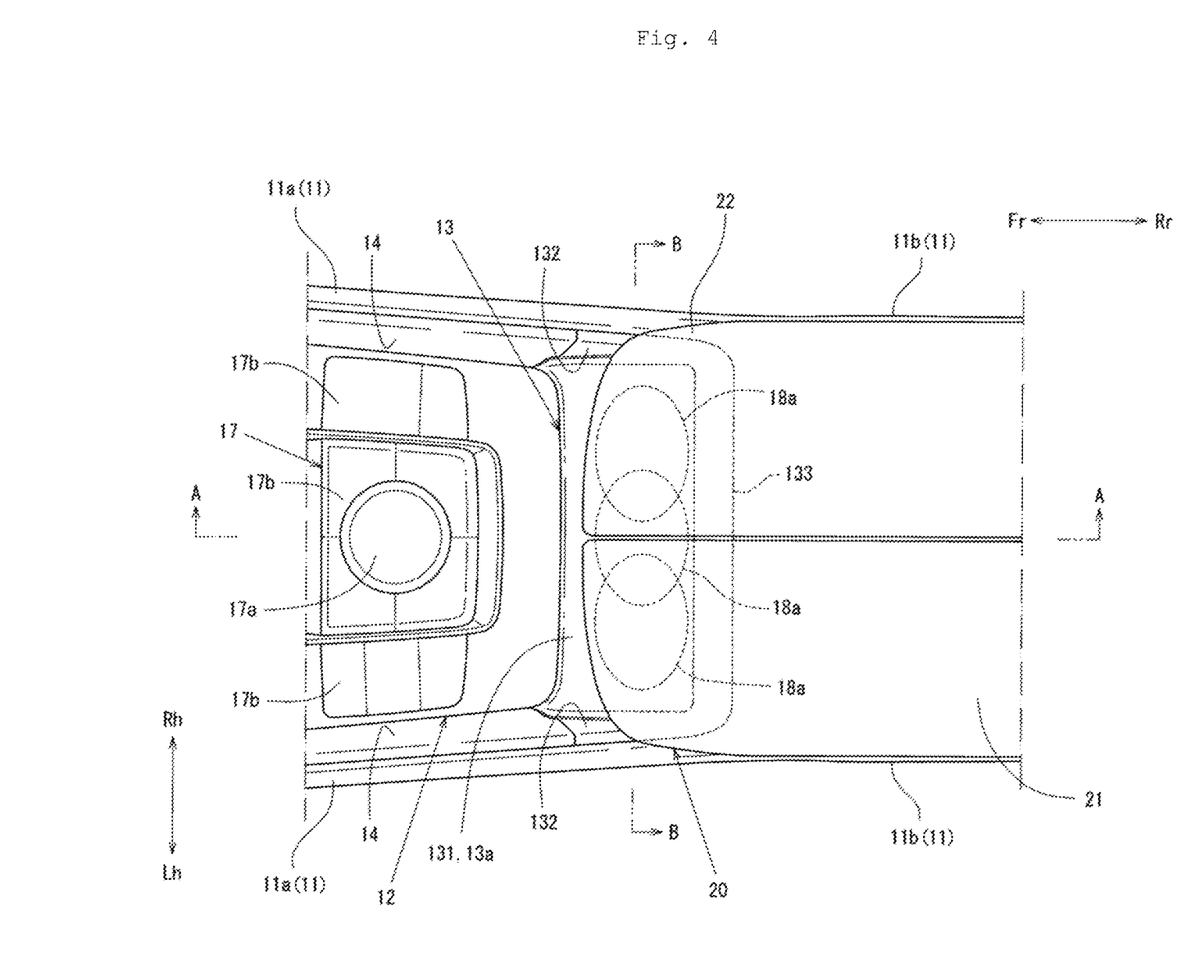
FIG. 4 is a plan view illustrating the center console.
Figure 5:
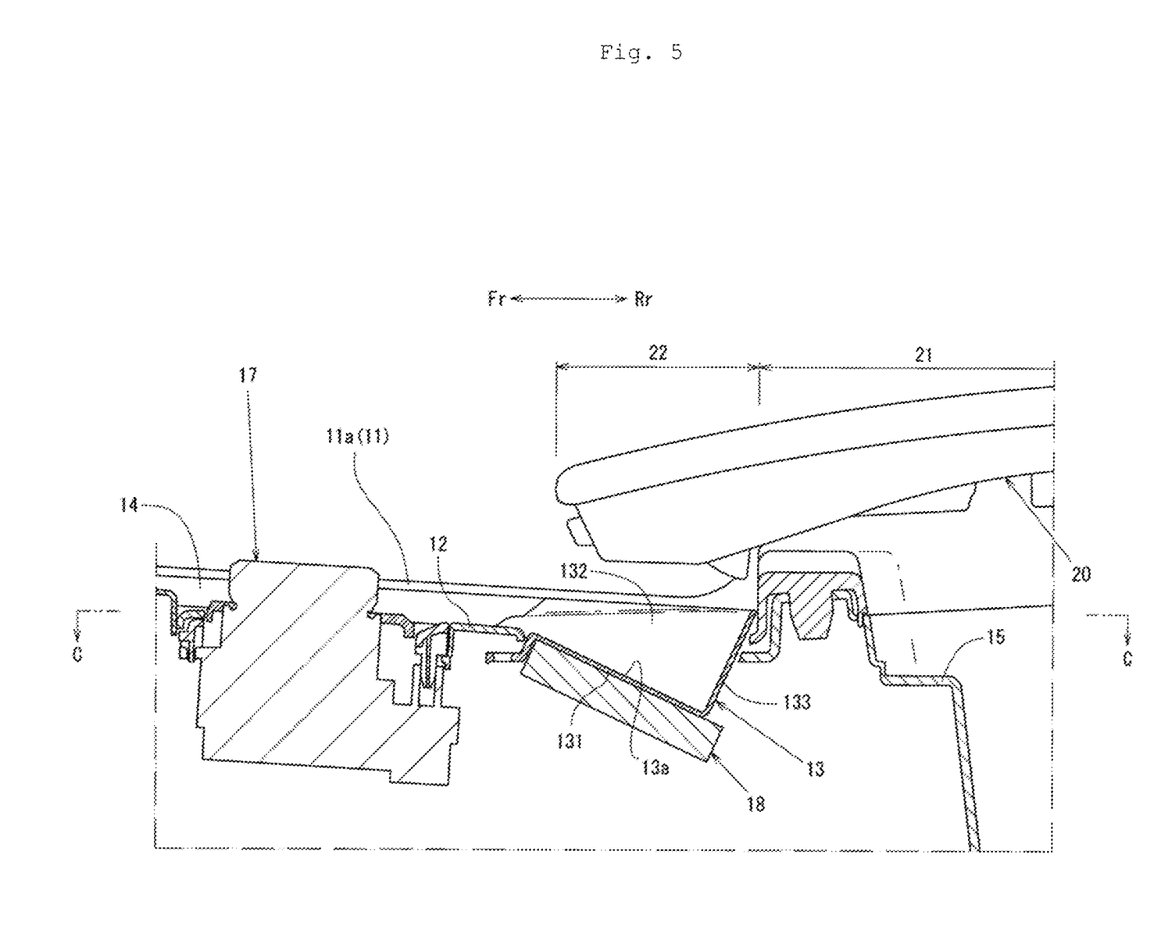
FIG. 5 is a cross-sectional view that is taken along arrow A-A in FIG. 4.

FIG. 1 is an external appearance perspective view of the center console 1 that is seen from a vehicle upper front side, FIG. 2 is an external appearance perspective view of an area around a terminal accommodation section 13, FIG. 3 is a plan view of a console body 10, FIG. 4 is a plan view of the center console 1, and FIG. 5 is a cross-sectional view that is taken along arrow A-A in FIG. 4.

Figure 6:
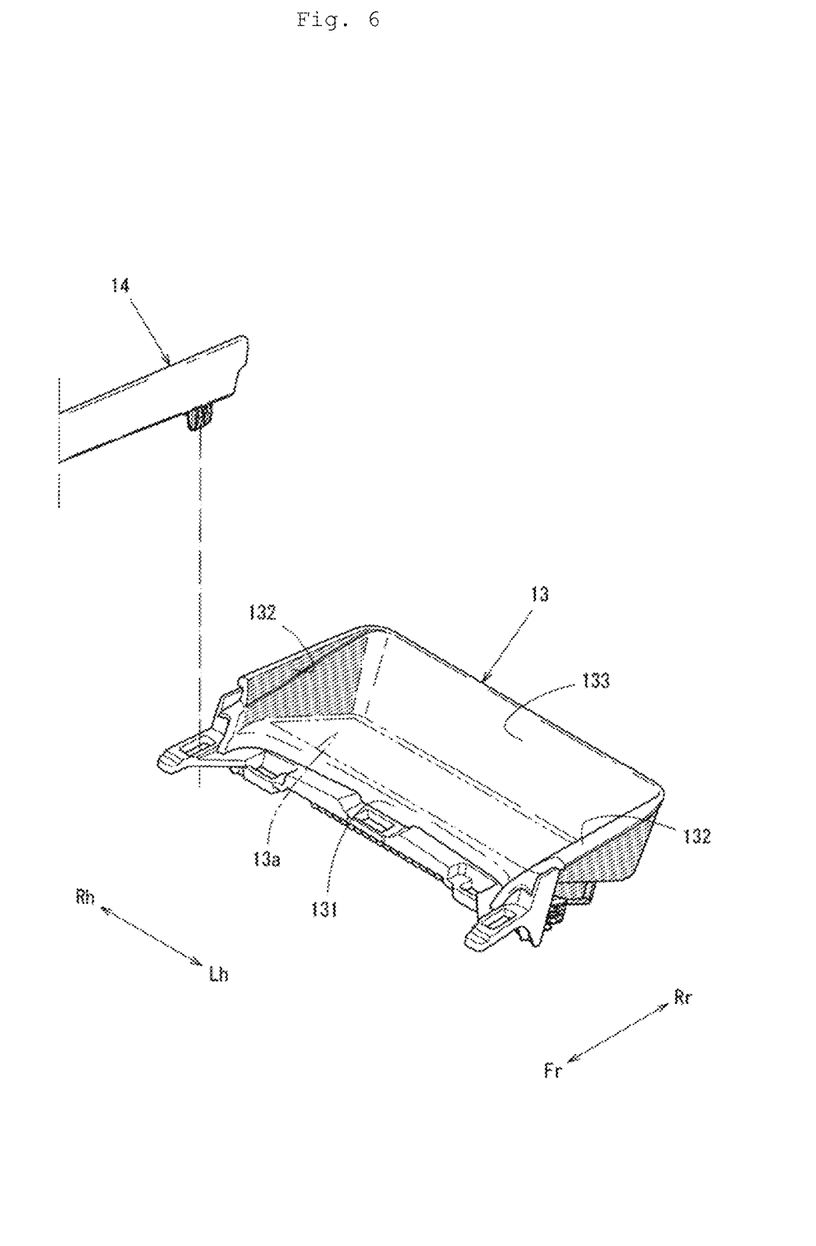
FIG. 6 is an external appearance perspective view illustrating the external appearance of the terminal accommodation section.
Figure 7:
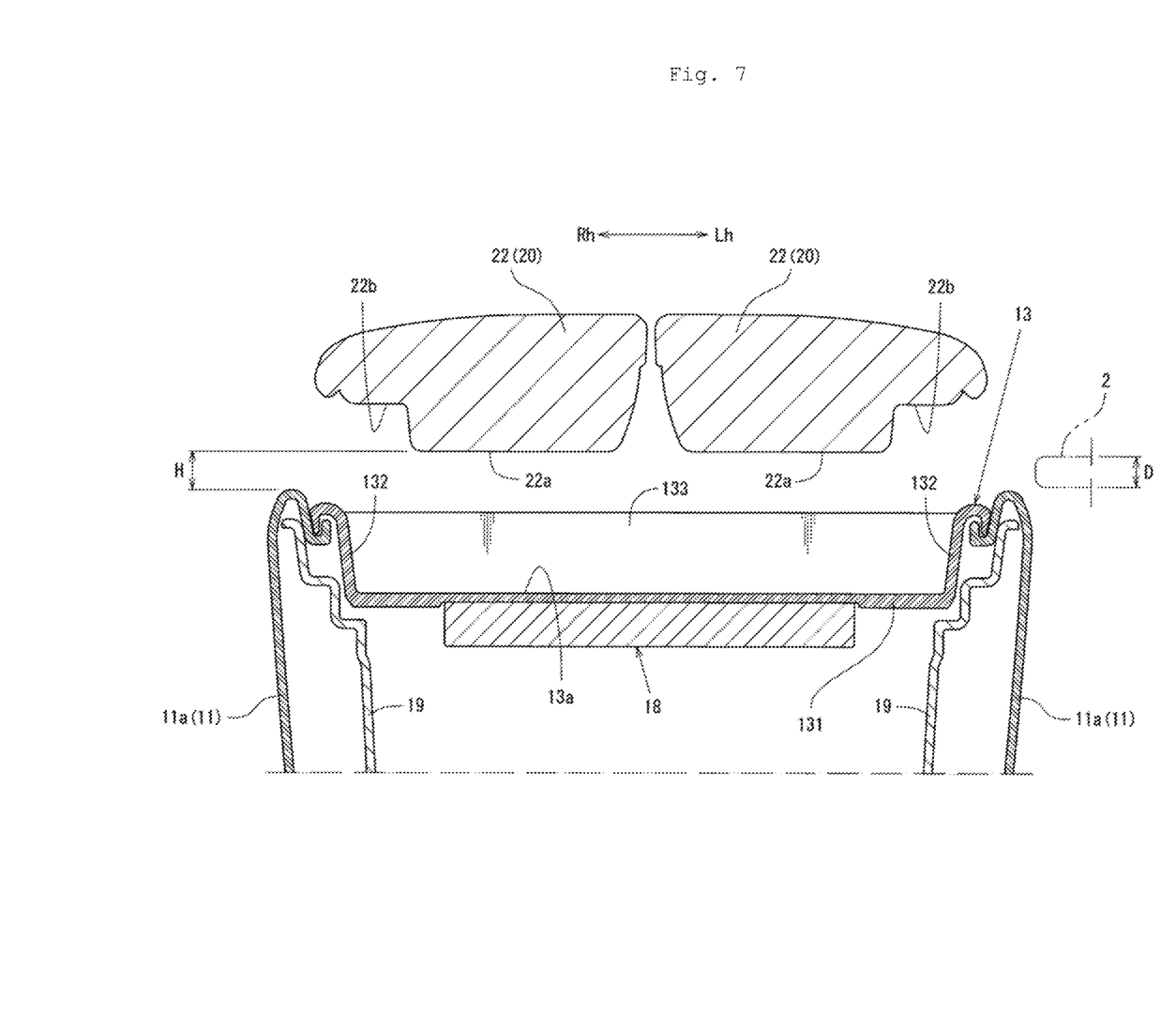
FIG. 7 is a cross-sectional view that is taken along arrow B-B in FIG. 4.
Figure 8:
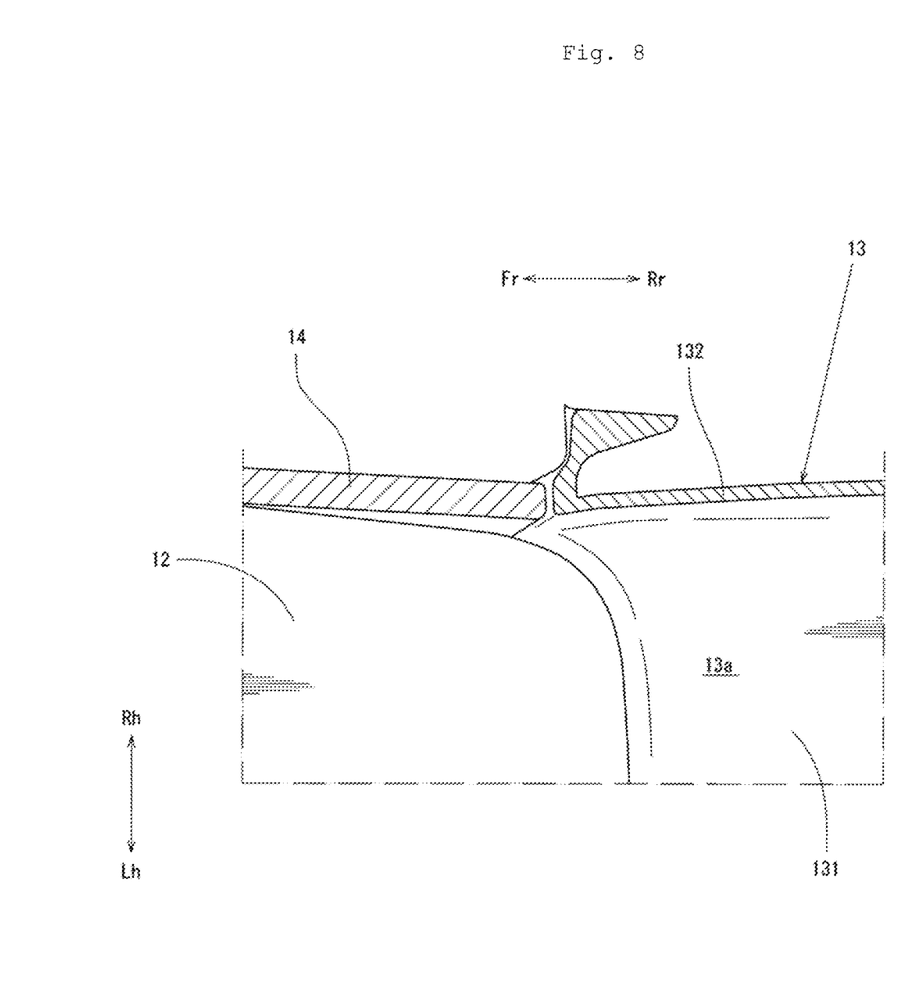
FIG. 8 is a cross-sectional view that is taken along arrow C-C in FIG. 5.
Figure 9:
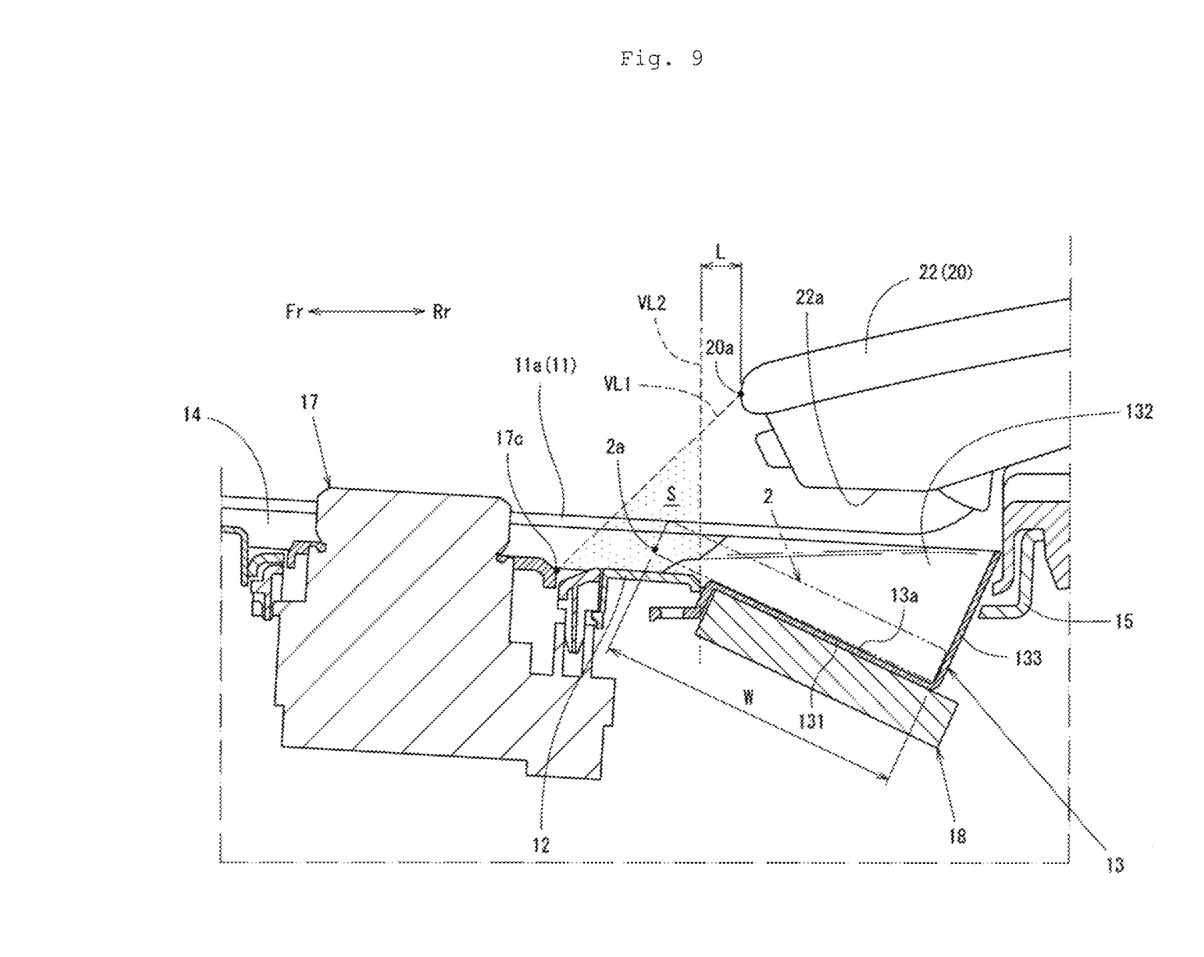
FIG. 9 is an explanatory view for explaining a relationship between a mobile terminal and a virtual area.

Furthermore, FIG. 6 is an external appearance perspective view of the terminal accommodation section 13, FIG. 7 is a cross-sectional view that is taken along arrow B-B in FIG. 4, FIG. 8 is a cross-sectional view that is taken along arrow C-C in FIG. 5, and FIG. 9 is an explanatory view for explaining a relationship between the mobile terminal 2 and a virtual area S.

In the drawings, in order to clarify the illustrations, the mobile terminal 2 is indicated by two-dot chain lines, and in FIG. 5, FIG. 7, FIG. 8, and FIG. 9, a body and a frame of the terminal accommodation section 13 are illustrated integrally.

In addition, in the drawings, an arrow Fr and an arrow Rr indicate a front-rear direction, the arrow Fr indicates a front direction, and the arrow Rr indicates a rear direction. Furthermore, an arrow Rh and an arrow Lh indicate a vehicle width direction, the arrow Rh indicates a right direction, and the arrow Lh indicates a left direction. Moreover, upper sides in the drawings indicate a vehicle upper side, and lower sides in the drawings indicate a vehicle lower side.

In a vehicle cabin, the center console 1 of this embodiment is arranged between right and left front seats, and a portion near a front end of the center console 1 is coupled to a lower portion of an instrument panel.

As illustrated in FIG. 1, this center console 1 is constructed of: the console body 10 extending in the vehicle front-rear direction; and an armrest 20 arranged in a rear portion and on top of the console body 10.

As illustrated in FIG. 1, the console body 10 includes: a right and left pair of console side surface sections 11 that oppose each other in the vehicle width direction and serve as side surfaces; a top plate section 12 and the terminal accommodation section 13 that are disposed between the console side surface sections 11 and serve as an upper surface of the console body 10; and a right and left pair of decorative panels 14 arranged on both sides in the vehicle width direction of the top plate section 12.

Furthermore, as illustrated in FIG. 1 and FIG. 2, the console body 10 includes: a console box 15 arranged on a vehicle rear side of the terminal accommodation section 13; a shift lever 16 and an operation section 17 provided on the top plate section 12; a power supply section 18 (see FIG. 5) arranged on the vehicle lower side of the terminal accommodation section 13; and a support member 19 supporting these components.

More specifically, as illustrated in FIG. 1, the right and left pair of the console side surface sections 11 is panel members that are long in the vehicle front-rear direction and constitutes external appearance design surfaces of the center console 1. As illustrated in FIG. 1, each of these console side surface sections 11 is formed by coupling a side surface front section 11a that is long in the vehicle front-rear direction and a side surface rear section 11b longer in a vehicle up-down direction than the side surface front section 11a in this order from a vehicle front side.

In detail, the side surface front section 11a is formed in such a shape that an upper end thereof is folded to the other console side surface section 11 side and to the vehicle lower side (see FIG. 7). In side view, an upper end edge of this side surface front section 11a is gradually inclined to the vehicle lower side toward the vehicle rear side (see FIG. 5).

Meanwhile, as illustrated in FIG. 1, the side surface rear section 11b is integrally formed on the vehicle rear side of the side surface front section 11a in such a manner that an upper end edge thereof is located at a position on the vehicle upper side of the upper end edge of the side surface front section 11a.

As illustrated in FIG. 1, the top plate section 12 is a panel member having a thickness in the up-down direction and is formed such that a front end thereof continues from the instrument panel. As illustrated in FIG. 1, this top plate section 12 is arranged such that, substantially at a center in the vehicle front-rear direction of the side surface front section 11a in the console side surface section 11, an upper surface of the top plate section 12 is located at a position on the vehicle lower side of the upper end edge of the side surface front section 11a.

As illustrated in FIG. 1 and FIG. 2, at a position between the right and left console side surface sections 11, the terminal accommodation section 13 is disposed on the vehicle rear side of the top plate section 12 and is formed such that an upper surface thereof continues from the upper surface of the top plate section 12.

Furthermore, as illustrated in FIG. 3 to FIG. 5, the upper surface of the terminal accommodation section 13 is formed as a placement surface 13a on which the mobile terminal 2 is placed in a state where a longitudinal direction thereof substantially matches the vehicle width direction.

The above-described top plate section 12 and the above-described terminal accommodation section 13 are formed such that, in a state where the mobile terminal 2 is placed on the placement surface 13a, a front end 2a of the mobile terminal 2 is separated to the vehicle upper side from the upper surface of the top plate section 12 (see FIG. 9).

As illustrated in FIG. 1, the right and left pair of the decorative panels 14 is substantially belt-shaped panel members that are long in the vehicle front-rear direction, and is arranged to oppose each other in the vehicle width direction on inner sides in the vehicle width direction of the console side surface sections 11.

As illustrated in FIG. 1, each of these decorative panels 14 is disposed to cover a clearance between the console side surface section 11 and the upper surface of the top plate section 12.

As illustrated in FIG. 5, in side view, the decorative panel 14 is formed such that an upper end edge thereof is substantially parallel to the upper end edge of the console side surface section 11.

As illustrated in FIG. 2 and FIG. 3, the console box 15 is a substantially box-shaped member that is opened to the vehicle upper side, and is arranged on the vehicle rear side of the terminal accommodation section 13 and between the side surface rear sections 11b.

As illustrated in FIG. 5, this console box 15 is arranged such that, in a perpendicular cross section along the vehicle front-rear direction, an upper end thereof is located at substantially the same position in the vehicle up-down direction as the upper end edge of the side surface rear section 11b.

That is, the console box 15 is arranged such that the upper end thereof is located at a position on the vehicle upper side of the upper surface of the top plate section 12 and an upper end of the terminal accommodation section 13.

The shift lever 16 is a lever that accepts an occupant's operation to shift a gear stage of a transmission of the vehicle. As illustrated in FIG. 1, this shift lever 16 is arranged in a vehicle front portion and substantially at the center in the vehicle width direction of the top plate section 12.

As illustrated in FIG. 1, at a position on the vehicle rear side of the shift lever 16 and on the vehicle front side of the armrest 20, the operation section 17 is arranged on the upper surface of the top plate section 12. As illustrated in FIG. 3, this operation section 17 is constructed of: a substantially cylindrical dial 17a arranged substantially at the center in the vehicle width direction; and plural buttons 17b arranged around the dial 17a, and has functions of accepting operations related to various vehicle settings and an operation of a navigation system, for example.

The power supply section 18 is a device that is connected to a power supply and wirelessly transmits the electric power to the mobile terminal 2 via the placement surface 13a of the terminal accommodation section 13. As illustrated in FIG. 5, this power supply section 18 is arranged to abut the terminal accommodation section 13 (a bottom surface portion 131, which will be described below) from the vehicle lower side.

The armrest 20 is a portion on which the occupant's forearm (from an elbow to a wrist) is placed. As illustrated in FIG. 1 to FIG. 4, the armrest 20 is formed to have a length in the vehicle front-rear direction from a rear end of the console body 10 to a portion near a rear end of the top plate section 12.

This armrest 20 is supported by the console box 15 in a freely openable/closable manner so as to function as a lid that covers the opening of the console box 15.

As illustrated in FIG. 1, the armrest 20 has a shape that is bilaterally divided substantially at the center in the vehicle width direction. However, a description will herein be made on the assumption that the armrest 20 is integrated.

More specifically, as illustrated in FIG. 1 and FIG. 5, the armrest 20 is constructed of: an armrest rear section 21 that serves as the lid covering the opening of the console box 15; and an armrest front section 22 that is projected to the vehicle front side from the armrest rear section 21 and opposes the placement surface 13a of the terminal accommodation section 13 in the vehicle up-down direction.

As illustrated in FIG. 4, in plan view, the armrest front section 22 extends from the armrest rear section 21 to have such a length in the vehicle front-rear direction not projected to the vehicle front side from the placement surface 13a of the terminal accommodation section 13.

Furthermore, as illustrated in FIG. 4, in plan view, the armrest front section 22 is formed to expose corners on the vehicle front side of the placement surface 13a of the terminal accommodation section 13. In detail, as illustrated in FIG. 4, the armrest front section 22 is formed to have a front end edge in a substantially curved shape in plan view in which a substantially central portion in the vehicle width direction is curved to be projected to the vehicle front side.

The description will be continued on further details of the terminal accommodation section 13, the power supply section 18, and the armrest 20 in the center console 1 with the above-described configuration and will also be made on a relative positional relationship with the mobile terminal 2 that is placed on the terminal accommodation section 13.

As illustrated in FIG. 6, the terminal accommodation section 13 is constructed of: a substantially box-shaped body (not denoted by a reference numeral) which has the placement surface 13a, and the vehicle upper side and the vehicle front side of which are opened; and a frame (not denoted by a reference numeral) supporting the body. The frame is formed with an opening with which the decorative panels 14 is engaged and an opening with which the top plate section 12 is engaged, for example.

As illustrated in FIG. 5 and FIG. 6, this terminal accommodation section 13 includes: the bottom surface portion 131, an upper surface of which serves as the placement surface 13a; a right and left pair of side wall portions 132 vertically provided from both ends in the vehicle width direction of the bottom surface portion 131; and a rear wall portion 133 vertically provided from a rear end of the bottom surface portion 131.

More specifically, as illustrated in FIG. 3, in plan view, the bottom surface portion 131 is formed to have a shorter length in the vehicle front-rear direction than a length of the mobile terminal 2 in the vehicle front-rear direction. As illustrated in FIG. 5, in the perpendicular cross section along the vehicle front-rear direction, this bottom surface portion 131 is formed in a substantially plate shape which opposes a lower surface of the armrest front section 22 with a specified distance being provided on the vehicle lower side thereof and in which a rear end is arranged to be located on the vehicle lower side of a front end.

In detail, as illustrated in FIG. 5, in the perpendicular cross section along the vehicle front-rear direction, the bottom surface portion 131 is formed such that the placement surface 13a as the upper surface is inclined at an angle of 15° with respect to a substantially horizontal virtual linear line.

The right and left pair of the side wall portions 132 is formed as restraint sections that restrain a position in the vehicle width direction of the mobile terminal 2.

In detail, as illustrated in FIG. 6 and FIG. 7, the right and left pair of the side wall portions 132 is vertically provided from both of the ends in the vehicle width direction of the bottom surface portion 131 toward the vehicle upper side and slightly toward the outer side in the vehicle width direction. As illustrated in FIG. 2, FIG. 3, and FIG. 5, each of these side wall portions 132 is formed such that a front end thereof is located at a position on the vehicle front side of the front end of the bottom surface portion 131.

As illustrated in FIG. 8, in a horizontal cross section along the vehicle front-rear direction, a surface on the inner side in the vehicle width direction of the side wall portion 132 is formed to continue from a surface on the inner side in the vehicle width direction of the decorative panel 14.

Furthermore, as illustrated in FIG. 5 and FIG. 7, in side view, the side wall portion 132 is formed in such a shape that an upper end edge thereof is substantially parallel to the upper end edge of the console side surface section 11 and continues from the upper end edge of the decorative panel 14.

As illustrated in FIG. 9, in the perpendicular cross section along the vehicle front-rear direction, as a positioning portion that positions the front end 2a of the mobile terminal 2 placed on the placement surface 13a, the rear wall portion 133 is provided substantially vertically with respect to the placement surface 13a.

As illustrated in FIG. 9, the mobile terminal 2 is a terminal having a terminal width W, as a length along a substantially parallel direction to the placement surface 13a, that is equal to or longer than 67 mm and equal to or shorter than 84 mm.

In detail, as illustrated in FIG. 9, when a virtual linear line that connects a front end 20a of the armrest 20 and a rear end 17c of the operation section 17 is set as a first virtual linear line VL1, the rear wall portion 133 of the terminal accommodation section 13 is vertically provided such that the front end 2a of the mobile terminal 2 is located on the vehicle rear side of the first virtual linear line VL1 on the vehicle upper side of the top plate section 12.

Furthermore, as illustrated in FIG. 9, when a substantially vertical virtual linear line that passes a position separated to the vehicle front side from the front end 20a of the armrest 20 by a specified distance L is set as a second virtual linear line VL2, the rear wall portion 133 is vertically provided such that the front end 2a of the mobile terminal 2 is located on the vehicle front side of the second virtual linear line VL2 and on the vehicle upper side of the top plate section 12. Here, the above-described specified distance L is in size of a fingertip of a large adult male and is set to 18 mm, for example.

That is, as illustrated in FIG. 9, in the perpendicular cross section along the vehicle front-rear direction, the rear wall portion 133 is vertically provided at a position in the vehicle front-rear direction that causes the front end 2a of the mobile terminal 2 to be located in the virtual area S that is a polygonal area surrounded by the first virtual linear line VL1, the second virtual linear line VL2, and the top plate section 12.

Such a virtual area S is set as an area that makes entry of the occupant's fingertip difficult at the time when the occupant operates the operation section 17 in a state of placing his/her forearm on the armrest front section 22 and an area that does not interfere with the placement/taking out of the mobile terminal 2 along the vehicle front-rear direction in the same state.

The power supply section 18 is a device that wirelessly transmits the electric power to the mobile terminal 2 by generating an induced electromotive force to a power-receiving coil of the mobile terminal 2, for example, at the time when the mobile terminal 2 is placed on the placement surface 13a of the terminal accommodation section 13. As illustrated in FIG. 4, three power-transmission coils 18a aligned in the vehicle width direction are installed in this power supply section 18.

The three power-transmission coils 18a are arranged such that, in the vehicle up-down direction, the power-transmission coil 18a substantially at the center in the vehicle width direction overlaps the two power-transmission coils 18a at both ends in the vehicle width direction.

Furthermore, as illustrated in FIG. 4, in plan view, the power supply section 18 is arranged such that the three power-transmission coils 18a overlap the placement surface 13a of the terminal accommodation section 13 and the armrest front section 22 in the vehicle up-down direction.

In addition, as illustrated in FIG. 5, in the perpendicular cross section along the vehicle front-rear direction, in the armrest 20, a lower surface of the armrest rear section 21 is formed as an inclined surface that is inclined to the vehicle lower side toward the vehicle front side, and the lower surface of the armrest front section 22 is formed as an inclined surface, a front end of which is located slightly on the vehicle upper side of a rear end.

Furthermore, as illustrated in FIG. 7 and FIG. 9, within a range in the vehicle front-rear direction that is substantially the same as the terminal accommodation section 13, the lower surface of the armrest front section 22 is formed at a position that is separated to the vehicle upper side from the upper end edge of the console side surface section 11 by a longer vertical distance H than a thickness D of the mobile terminal 2.

In detail, as illustrated in FIG. 7, in a perpendicular cross section along the vehicle width direction, the armrest front section 22 is formed to have a substantially projected cross section in which a substantially central portion thereof in the vehicle width direction is projected to the vehicle lower side.

Accordingly, as illustrated in FIG. 7, the lower surface of the armrest front section 22 is formed to have a substantially hat-shaped cross section including: a central lower surface 22a substantially at the center in the vehicle width direction; and an end lower surface 22b located on each side in the vehicle width direction of the central lower surface 22a and located on the vehicle upper side of the central lower surface 22a.

In addition, as illustrated in FIG. 7, the central lower surface 22a of the armrest front section 22 is formed at the position that is separated to the vehicle upper side from the upper end edge of the console side surface section 11 by the longer vertical distance H than the thickness D of the mobile terminal 2.

Thus, a distance in the vehicle up-down direction between the central lower surface 22a of the armrest front section 22 and the upper end of the terminal accommodation section 13 is longer than the thickness D of the mobile terminal 2.

Meanwhile, as illustrated in FIG. 7, in the perpendicular cross section along the vehicle width direction, the end lower surface 22b of the armrest front section 22 is formed such that an end portion thereof on the outer side in the vehicle width direction is located at substantially the same position in the vehicle width direction as the side wall portion 132 of the terminal accommodation section 13.

With such a configuration, as illustrated in FIG. 7 and FIG. 9, in the center console 1, a space into/from which the mobile terminal 2 can be placed/taken out along the vehicle width direction is formed between the lower surface of the armrest front section 22 and the upper end edge of the console side surface section 11.

Furthermore, in the center console 1, a space into/from which the mobile terminal 2 can be placed/taken out along the vehicle front-rear direction is formed between the lower surface of the armrest front section 22 and the placement surface 13a of the terminal accommodation section 13.

As it has been described so far, the center console structure for the vehicle in this embodiment includes: the console body 10 extending in the vehicle front-rear direction in the vehicle cabin; the armrest 20 arranged on top of the console body 10; and the power supply section 18 that wirelessly transmits the electric power to the mobile terminal 2 via the placement surface 13a on which the mobile terminal 2 is placed.

Furthermore, the upper surface of the console body 10 includes: the terminal accommodation section 13 that has the placement surface 13a and is arranged on the vehicle lower side of the armrest 20; and the top plate section 12 on which the operation section 17 accepting the occupant's operation is provided and that is arranged on the vehicle front side of the terminal accommodation section 13.

Here, in the perpendicular cross section along the vehicle front-rear direction, the virtual linear line that connects the rear end 17c of the operation section 17 and the front end 20a of the armrest 20 is set as the first virtual linear line VL1, and the substantially vertical virtual linear line that passes the position separated to the vehicle front side from the front end 20a of the armrest 20 by the specified distance L is set as the second virtual linear line VL2. Furthermore, a range surrounded by the first virtual linear line VL1, the second virtual linear line VL2, and the upper surface of the console body 10 is set as the virtual area S.

In the perpendicular cross section along the vehicle front-rear direction, the terminal accommodation section 13 includes the rear wall portion 133 that positions the front end 2a of the mobile terminal 2 within the virtual area S, and the mobile terminal 2 has the terminal width W that is the length along the substantially parallel direction to the placement surface 13a and is equal to or longer than 67 mm and equal to or shorter than 84 mm.

According to the above, the center console structure for the vehicle can simultaneously secure operability of the operation section 17 and a take-out property of the mobile terminal 2.

More specifically, due to the rear wall portion 133 of the terminal accommodation section 13, the front end 2a of the mobile terminal 2 is located on the vehicle rear side of the first virtual linear line VL1. Thus, the center console structure for the vehicle can prevent the occupant's hand from contacting the mobile terminal 2 when the occupant operates the operation section 17 in a state of placing his/her forearm on the armrest 20.

Furthermore, due to the rear wall portion 133 of the terminal accommodation section 13, the front end 2a of the mobile terminal 2 is located on the vehicle front side of the second virtual linear line VL2. Thus, the center console structure for the vehicle can prevent the mobile terminal 2 from being hidden on the vehicle lower side of the armrest 20, which makes it difficult to take out the mobile terminal 2.

Therefore, the center console structure for the vehicle can simultaneously secure the operability of the operation section 17 and the take-out property of the mobile terminal 2.

In plan view, the power supply section 18 is arranged to overlap both of the armrest 20 and the placement surface 13a of the terminal accommodation section 13.

With this configuration, in the center console structure for the vehicle, the armrest 20 can reliably be interposed between the mobile terminal 2 that is being charged and the occupant's head.

Accordingly, even when the occupant moves his/her line of sight to the mobile terminal 2, for example, in the center console structure for the vehicle, the armrest 20 can reliably hide the mobile terminal 2 from the occupant's eyesight.

In this way, the center console structure for the vehicle can inhibit inattentive driving by the occupant without interfering with taking out of the mobile terminal 2.

In the perpendicular cross section along the vehicle front-rear direction, the top plate section 12 and the placement surface 13*a* of the terminal accommodation section are formed such that the front end 2*a* of the mobile terminal 2 is located on the vehicle upper side of the top plate section 12.

With this configuration, the center console structure for the vehicle can provide a clearance between a portion near the front end 2*a* of the mobile terminal 2 and the top plate section 12.

Thus, in the center console structure for the vehicle, when attempting to take out the mobile terminal 2, the occupant can grasp and take out the mobile terminal 2 in the vehicle up-down direction. In this way, the center console structure for the vehicle can further facilitate taking out of the mobile terminal 2.

In plan view, the front end edge of the armrest 20 is formed in the substantially curved shape in which the substantially central portion in the vehicle width direction is projected to the vehicle front side.

With this configuration, in plan view, the center console structure for the vehicle can prevent the corner portion on the vehicle front side in the placement surface 13*a* from being hidden by the armrest 20. In other words, in plan view, the center console structure for the vehicle can expose the corner portion on the vehicle front side in the placement surface 13*a*.

Accordingly, even in the case where the mobile terminal 2 is heavy and has the long terminal width W, or even in the case where the mobile terminal 2 has the short terminal width W, the occupant can firmly grasp and take out the mobile terminal 2 without interference with the armrest 20.

Furthermore, in the center console structure for the vehicle, even in the state of placing his/her forearm on the armrest 20, the occupant can easily touch the mobile terminal 2 placed on the placement surface 13*a* by moving his/her wrist to one side in the vehicle width direction.

In this way, the occupant can take out the mobile terminal 2 without significantly moving his/her line of sight. Thus, the center console structure for the vehicle can improve the take-out property of the mobile terminal 2.

In the armrest 20, the lower surface that opposes the placement surface 13*a* is formed as the inclined surface inclined such that the front end thereof is located on the vehicle upper side with respect to the rear end.

With this configuration, the center console structure for the vehicle can secure the large space above the front end of the placement surface 13*a* of the terminal accommodation section 13. Therefore, the center console structure for the vehicle can further facilitate taking out of the mobile terminal 2.

In regard to correspondence between the configuration in the present disclosure and the above-described embodiment, the positioning portion in the present disclosure corresponds to the rear wall portion 133 in the embodiment. However, the present disclosure is not limited to the configuration in the above-described embodiment but can implement any of various embodiments.

For example, in the above-described embodiment, the armrest 20 is bilaterally divided. However, the present disclosure is not limited thereto. The armrest may not be bilaterally divided.

In addition, the armrest 20 is supported by the console body 10. However, the present disclosure is not limited thereto. The armrest may be supported by a portion other than the console body 10, for example, a seatback of the front seat.

The armrest 20 has the lower surface with the substantially projected cross section that is projected to the vehicle lower side. However, the present disclosure is not limited thereto. As long as the vertical distance H is longer than the thickness D of the mobile terminal 2, the armrest may have the flat lower surface.

The top plate section 12 includes the shift lever 16 and the operation section 17. However, the present disclosure is not limited thereto. The top plate section may not include the shift lever 16 and the operation section 17. Alternatively, the top plate section may only include the shift lever 16, or the top plate section may only include the operation section 17.

In the case of the top plate section that only includes the shift lever 16, the first virtual linear line VL1 is a virtual linear line that connects the front end 20*a* of the armrest 20 and the rear end of the shift lever 16.

In addition, the second virtual linear line VL2 is set as the virtual linear line that passes the position separated from the front end 20*a* of the armrest 20 by the specified distance L. However, the present disclosure is not limited thereto. A substantially vertical virtual linear line that passes the position of the front end 20*a* of the armrest 20 may be set as the second virtual linear line VL2.

What is claimed is:

1. A center console structure for a vehicle, comprising:
   a console body that extends in a vehicle front-rear direction in a vehicle cabin;
   an armrest that is arranged on a vehicle upper side of said console body; and
   a power supply section that wirelessly transmits electric power to a mobile terminal via a placement surface on which the mobile terminal is placed, wherein
   an upper surface of the console body includes a terminal accommodation section that has the placement surface and is arranged on a vehicle lower side of the armrest, and a top plate section that is provided with an operation section accepting an occupant's operation and is arranged on a vehicle front side of the terminal accommodation section,
   in a perpendicular cross section along a vehicle front-rear direction, a virtual linear line that connects a rear end of the operation section and a front end of the armrest is set as a first virtual linear line,
   a substantially vertical virtual linear line that passes a position separated to the vehicle front side from the front end of the armrest by a specified distance or a front end position of the armrest is set as a second virtual linear line,
   a range surrounded by the first virtual linear line, the second virtual linear line, and the upper surface of the console body is set as a virtual area, and
   in the perpendicular cross section along the vehicle front-rear direction, the terminal accommodation section includes a positioning portion positioning the mobile terminal such that a front end of the mobile terminal is located in the virtual area, the mobile terminal having a terminal width that is a length along a substantially parallel direction to the placement surface and is equal to or longer than 67 mm and equal to or shorter than 84 mm.

2. The center console structure for the vehicle according to claim 1, wherein the power supply section is arranged to overlap both of the armrest and the placement surface of the terminal accommodation section.

3. The center console structure for the vehicle according to claim 2, wherein
in the perpendicular cross section along the vehicle front-rear direction, the top plate section and the placement surface of the terminal accommodation section are formed such that the front end of the mobile terminal is located on the vehicle upper side of the top plate section.

4. The center console structure for the vehicle according to claim 3, wherein
a front end edge of the armrest is formed in a substantially curved shape in which a substantially central portion in a vehicle width direction is projected to the vehicle front side.

5. The center console structure for the vehicle according to claim 4, wherein
in the armrest, a lower surface that opposes the placement surface is formed as an inclined surface inclined such that a front end thereof is located on the vehicle upper side with respect to a rear end of the inclined surface.

6. The center console structure for the vehicle according to claim 1, wherein
in the perpendicular cross section along the vehicle front-rear direction, the top plate section and the placement surface of the terminal accommodation section are formed such that the front end of the mobile terminal is located on the vehicle upper side of the top plate section.

7. The center console structure for the vehicle according to claim 1, wherein
a front end edge of the armrest is formed in a substantially curved shape in which a substantially central portion in a vehicle width direction is projected to the vehicle front side.

8. The center console structure for the vehicle according to claim 2, wherein
a front end edge of the armrest is formed in a substantially curved shape in which a substantially central portion in a vehicle width direction is projected to the vehicle front side.

9. The center console structure for the vehicle according to claim 6, wherein
a front end edge of the armrest is formed in a substantially curved shape in which a substantially central portion in a vehicle width direction is projected to the vehicle front side.

10. The center console structure for the vehicle according to claim 1, wherein
in the armrest, a lower surface that opposes the placement surface is formed as an inclined surface inclined such that a front end thereof is located on the vehicle upper side with respect to a rear end of the inclined surface.

11. The center console structure for the vehicle according to claim 2, wherein
in the armrest, a lower surface that opposes the placement surface is formed as an inclined surface inclined such that a front end thereof is located on the vehicle upper side with respect to a rear end of the inclined surface.

12. The center console structure for the vehicle according to claim 6, wherein
in the armrest, a lower surface that opposes the placement surface is formed as an inclined surface inclined such that a front end thereof is located on the vehicle upper side with respect to a rear end of the inclined surface.

13. The center console structure for the vehicle according to claim 7, wherein
in the armrest, a lower surface that opposes the placement surface is formed as an inclined surface inclined such that a front end thereof is located on the vehicle upper side with respect to a rear end of the inclined surface.

14. The center console structure for the vehicle according to claim 8, wherein
in the armrest, a lower surface that opposes the placement surface is formed as an inclined surface inclined such that a front end thereof is located on the vehicle upper side with respect to a rear end of the inclined surface.

15. The center console structure for the vehicle according to claim 3, wherein
in the armrest, a lower surface that opposes the placement surface is formed as an inclined surface inclined such that a front end thereof is located on the vehicle upper side with respect to a rear end of the inclined surface.

16. The center console structure for the vehicle according to claim 9, wherein
in the armrest, a lower surface that opposes the placement surface is formed as an inclined surface inclined such that a front end thereof is located on the vehicle upper side with respect to a rear end of the inclined surface.

17. A vehicle, comprising:
a center console structure including
a console body that extends in a vehicle front-rear direction in a vehicle cabin;
an armrest that is arranged on a vehicle upper side of said console body; and
a power supply section that wirelessly transmits electric power to a mobile terminal via a placement surface on which the mobile terminal is placed, wherein
an upper surface of the console body includes a terminal accommodation section that has the placement surface and is arranged on a vehicle lower side of the armrest, and a top plate section that is provided with an operation section accepting an occupant's operation and is arranged on a vehicle front side of the terminal accommodation section,
in a perpendicular cross section along a vehicle front-rear direction, a virtual linear line that connects a rear end of the operation section and a front end of the armrest is set as a first virtual linear line,
a substantially vertical virtual linear line that passes a position separated to the vehicle front side from the front end of the armrest by a specified distance or a front end position of the armrest is set as a second virtual linear line,
a range surrounded by the first virtual linear line, the second virtual linear line, and the upper surface of the console body is set as a virtual area, and
in the perpendicular cross section along the vehicle front-rear direction, the terminal accommodation section includes a positioning portion positioning the mobile terminal such that a front end of the mobile terminal is located in the virtual area, the mobile terminal having a terminal width that is a length along a substantially parallel direction to the placement surface and is equal to or longer than 67 mm and equal to or shorter than 84 mm.

18. The vehicle of claim 17, wherein
the power supply section is arranged to overlap both of the armrest and the placement surface of the terminal accommodation section.

19. The vehicle of claim 18, wherein
in the perpendicular cross section along the vehicle front-rear direction, the top plate section and the placement surface of the terminal accommodation section are formed such that the front end of the mobile terminal is located on the vehicle upper side of the top plate section.

20. The vehicle of claim 19, wherein
a front end edge of the armrest is formed in a substantially curved shape in which a substantially central portion in a vehicle width direction is projected to the vehicle front side.

* * * * *